United States Patent [19]

Szepaniak

[11] 4,062,498
[45] Dec. 13, 1977

[54] MOBILE WOOD CHIPPER UNIT

[76] Inventor: Pertti Leo Juhani Szepaniak, Tolosenmaki, 82500 Kitee, Finland

[21] Appl. No.: 631,569

[22] Filed: Nov. 13, 1975

[30] Foreign Application Priority Data

Nov. 15, 1974 Finland .................................. 743318

[51] Int. Cl.² ............................................ B02C 23/00
[52] U.S. Cl. ................................... 241/101.7; 144/2 Z
[58] Field of Search ............... 241/92, 101.7; 144/2 Z, 144/3 D, 208 R, 242 R, 309 AC, 311, 312

[56] References Cited

U.S. PATENT DOCUMENTS

| 3,329,184 | 7/1967 | Longert | 144/2 Z |
|---|---|---|---|
| 3,356,116 | 12/1967 | Brundell et al. | 144/309 AC |
| 3,635,410 | 1/1972 | Smith | 241/92 X |
| 3,642,041 | 2/1972 | Hamilton et al. | 144/309 AC |
| 3,651,845 | 3/1972 | Propst | 144/309 AC X |
| 3,763,905 | 10/1973 | Hamilton et al. | 144/2 Z |
| 3,955,765 | 5/1976 | Gaitten | 241/101.7 |

Primary Examiner—Roy Lake
Assistant Examiner—Howard N. Goldberg
Attorney, Agent, or Firm—Ladas, Parry, Von Gehr, Goldsmith & Deschamps

[57] ABSTRACT

A mobile wood chipper unit for chipping preferably thin trees or branches left on the ground when felling trees. The unit comprises a chipper having a feeder which preferably can be directed towards both sides of the chipping unit and is adjustable both in the vertical and the horizontal plane. The chips are then transferred to a container.

6 Claims, 4 Drawing Figures

Fig. 1

MOBILE WOOD CHIPPER UNIT

This invention relates to a mobile wood chipper unit which can be connected to a tractor or similar or has a driving motor of its own.

Nowadays the woodworking industry is, due to shortage of raw material, forced to use thinner and thinner trees and twigs which were earlier considered useless. The object of the present invention is to provide a wood chipper unit by means of which twigs or the like which are left on the ground in felling can be effectively collected and converted into chips on the spot in the terrain.

The wood chipper unit according to the invention is characterized in that it comprises
  a chipper with feeding means,
  lifting means for transferring trees into the chipper feeding means,
  a chip container, and
  a chip transfer pipe connecting the chipper to the chip container.

The feeding means of said chipper can be directed both in horizontal and vertical plane. The horizontal directing can be done to both sides of the unit which increases the working area. The vertical directing is of advantage especially when handling short trees, which can then be made to fall into the chipper by their own weight.

The wood chipper unit according to the invention is well adapted for use in the terrain, where it can move along the driving tracks and collect branches fallen on the ground in connection with the trimming of trees and convert then into chips. The wood chipper unit is also capable of handling fibre wood of normal size as such, thus offering also a new logging method.

The invention will be described in more detail in the following with reference to the accompanying drawing.

Figure 1:
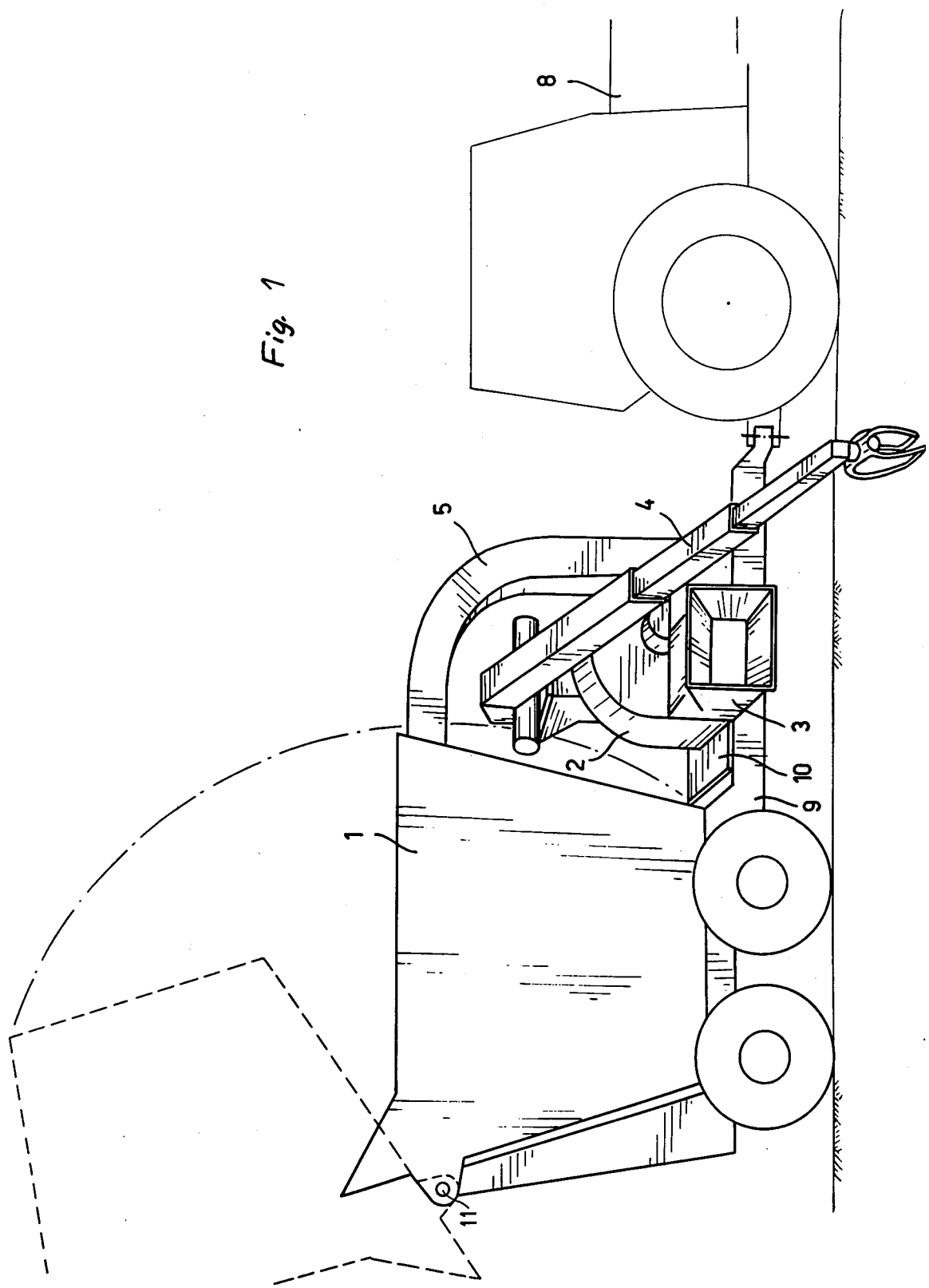
FIG. 1 is a schematic side view of a wood chipper unit according to the invention.
Figure 2:
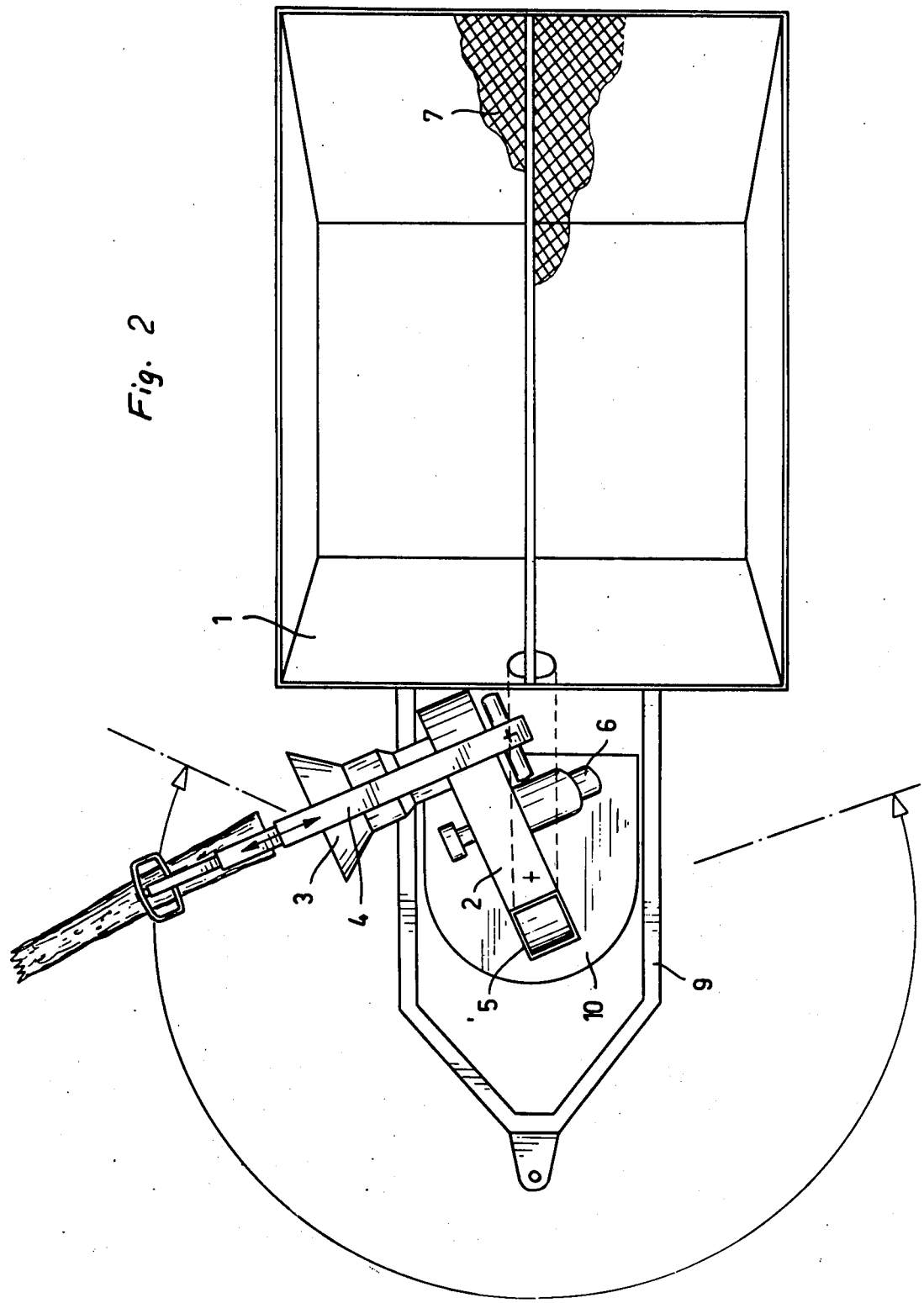
FIG. 2 is a top view of the same unit.

In the embodiment according to the drawing, a tractor 8 is used both as pulling means and power source of the wood chipper unit. On a trailer frame 9 coupled to the tractor 8 are arranged the main parts of the wood chipper unit: a chip container 1, a chipper 2 with feeding means 3, a chip transfer pipe 5 and lifting means 4 connecting the chipper 2 to the chip container 1.

The chipper 2 with feeding means 3 as well as the lifting means 4 are advantageously arranged on a frame 10 turnable in relation to the trailer frame 9. Thus the feeding means 3 of the chipper can at each particular time be directed in the desired direction making the function of the wood chipper unit substantially more flexible. Hydraulic or mechanic means known per se can be used as directing means. The feeding means 3 can be directed to both sides of the unit. A conventional crane used in forestry work, can be used as lifting means 4. The crane can be arranged either to follow the movement of the chipper feeding means 3 or to be driven independently thereof.

Figure 3:
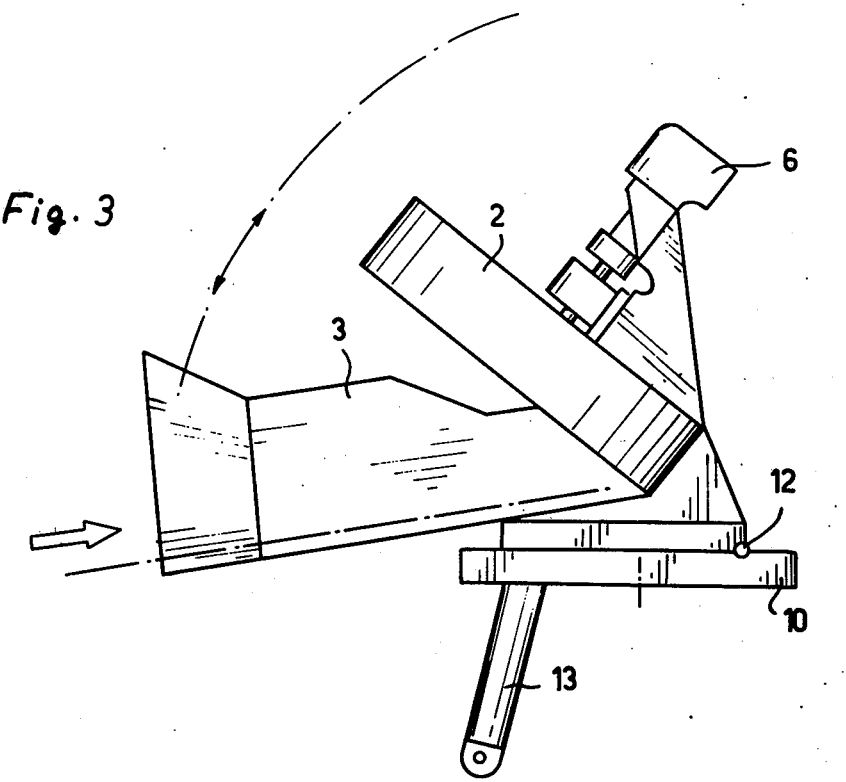
FIGS. 3 and 4 show the directing of the chipper in vertical plane.
Figure 4:
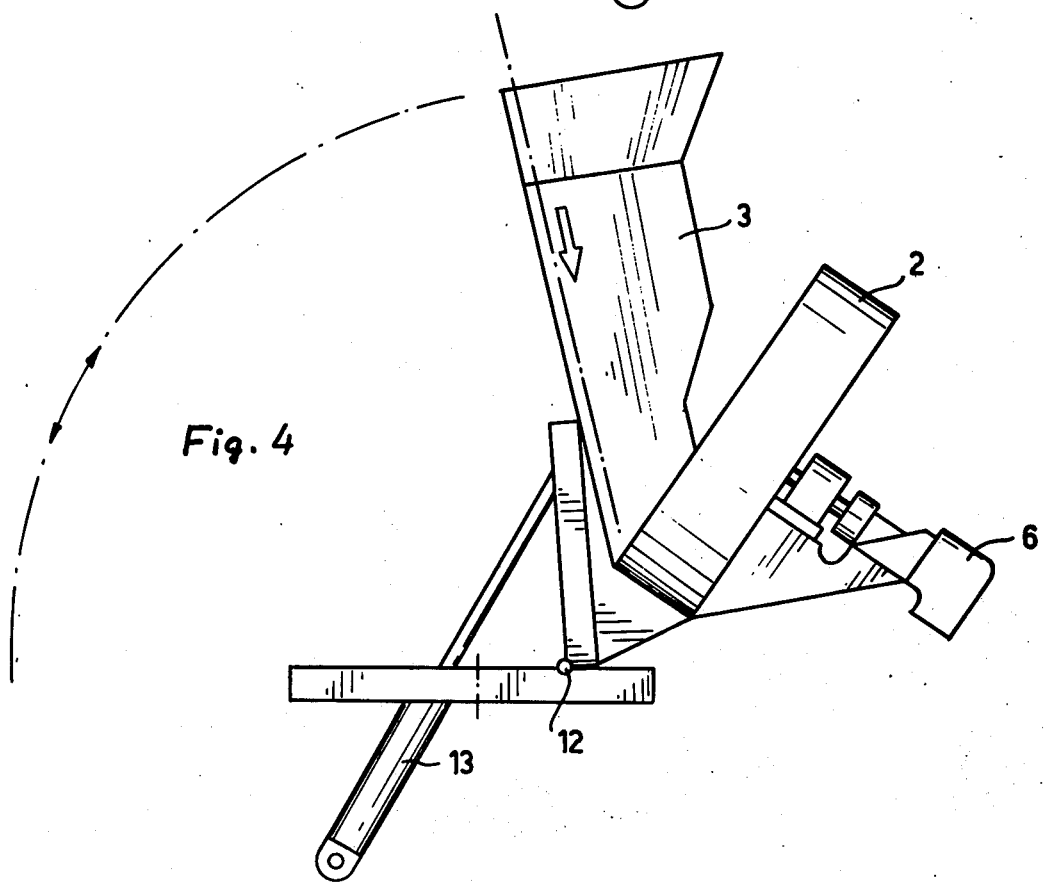

The feeding means 3 of the chipper 2 can also be directed in the vertical plane. This alignment can be accomplished in the manner shown in FIGS. 3 and 4. In the case shown in the drawing, the chipper 2 moves together with the feeding means 3 both in horizontal and vertical alignment, but the feeding means can also be arranged to be manouvered independently of the chipper 2. The chipper 2 with feeding means 3 and a hydraulic motor 6 serving as chipper driving means are pivoted in vertical plane to the frame 10. The turning of the chipper about a bearing 12 is advantageously accomplished by means of a hydraulic cylinder 13 attached to the trailer frame 9. The turning range is advantageously 90° so that the chipper feeding means 3 can reach a nearly vertical position. This position is advantageous when handling short trees, whereby these fall into the chipper 2 by their own weight.

The wood chipper unit according to the invention can advantageously be driven e.g. along drag tracks. Small trees and branches on the ground are transferred with the crane 4 into the chipper feeding means 3 feeding them into the chipper 2. The chips are then transferred by utilizing the blowing force of the chipper through the transfer pipe 5 into the chip container 1. At the top, the chip container is advantageously covered with a protective net 7 preventing chips coming from the pipe 5 from being hurled outside the container 1. For emptying, the chip container is tippable about a bearing 11, whereby said protective net 7, which is not fastened to the rear edge of the chip container 1, allows a controlled discharge of chips.

Another preferable embodiment, not shown in the drawing, of the protective top net of the chip container is to form it from two door-like halves each hinged to its own side of the chip container. The centres of the "door-halves" are preferably interconnected by e.g. a string or a wire of predetermined length, whereby the net by tipping the container backwards will open up to a predetermined extend which enables a controlled emptying of the chip container.

During emptying, the trailer can be supported with separate, e.g. hydraulically operating supporting legs not shown in the drawing.

The wood chipper unit according to the invention is not strictly limited to the embodiment above, but can in its details vary within the frames of the claims. Thus, e.g. the crane 4 need not be located in connection with the chipper in a manner shown in the drawing, but can be arranged for instance on top of the pilot house of a tractor. The wood chipper unit can be coupled to another driving means than a tractor or can alternatively be provided with a driving motor of its own. Likewise, the directing of the chipper can be accomplished by utilizing several other different hydraulic or mechanic means. Also, with regard to the chip container and the emptying thereof, there are naturally a number of alternative solutions.

What I claim is:

1. A mobile wood chipper unit comprising:
  a chipper with feeding means;
  a lifting means for transferring trees into the feeding means of the chipper;
  a tippable chip container;
  a chip transfer pipe connecting the chipper to the chip container; and
  net-like means covering the chip container to prevent chips from being hurled out of the container.

2. A wood chipper unit as claimed in claim 1, wherein the feeding means of the chipper can be directed in the horizontal plane.

3. A wood chipper unit as claimed in claim 1, wherein the feeding means of the chipper can be directed in the vertical plane.

4. A wood chipper unit as claimed in claim 2, wherein the chipper is arranged to follow turning motion of the feeding means.

5. A wood chipper unit as claimed in claim 1, wherein said lifting means is arranged to follow motion of the feeding means of the chipper in the horizontal plane.

6. A wood chipper unit as claimed in claim 1, wherein the chip transfer pipe is flexible and detachably connected to the chip container.

* * * * *